UNITED STATES PATENT OFFICE.

EDWARD P. GAINES, OF TEXARKANA, TEXAS, ASSIGNOR OF ONE-HALF TO FRANK G. EDMISTON, OF TEXARKANA, TEXAS.

COMPOUND FOR CURING AND COLORING MEAT.

No. 863,978.  Specification of Letters Patent.  Patented Aug. 20, 1907.

Application filed August 17, 1906. Serial No. 331,057.

*To all whom it may concern:*

Be it known that I, EDWARD P. GAINES, a citizen of the United States, residing at Texarkana in the county of Bowie and State of Texas, have invented a new and useful Compound for Curing and Coloring Meat, of which the following is a specification.

This invention relates to compounds for curing and coloring pork, beef and other meats and has for its object to provide a compound or solution by means of which meat and other organic matter may be effectually preserved for an indefinite period without the necessity of salting the meat or subjecting the same to the usual smoking process.

With these and other objects in view the invention consists in a compound or solution formed of the following ingredients in the proportions stated to-wit:

To make one gallon or one hundred and twenty-eight ounces of the compound, the following ingredients are employed substantially in the proportions below stated: Pure sugar, browned sufficiently to impart the desired color without detracting from its sweetening properties, 25 ounces; pyroligneous acid, 27 ounces; pure table salt, 3.2 ounces; and pure soft clear water 72.8 ounces.

In carrying the invention into effect, the acid, browned sugar and salt are placed in a suitable receptacle containing the water and the mixture thoroughly stirred or agitated until the parts are well blended and boiled for 30 minutes.

To give dry salt meats such as pork and the like the flavor and appearance of smoked meat, the pork is dipped or immersed in the liquid solution and then placed in a drying room and allowed to remain until the moisture is eliminated thus preserving the meat as effectually and more economically than by the usual smoking process.

For curing and coloring beef and other fresh meats, equal parts of pyroligneous acid, water and browned sugar are used in preparing the compound, the meat being dipped or immersed in the solution and subsequently dried in the manner before stated.

The browned sugar colors the meat and also sugar-cures the meat while the pyroligneous acid cures the meat and renders the usual smoking operation unnecessary, thus reducing the length of time consumed in curing and preserving meats and materially reducing the cost of production.

The compound is harmless from a hygienic standpoint and will not impair the nutritive properties of the meat but on the contrary will prevent the meat from tainting, and will render the same sanitary and wholesome.

While the compound is principally employed for treating fresh and salt meats it is obvious that the same may be used with equally good results for curing and preserving fish, game and other organic matter.

The proportions above given may, of course, be varied somewhat according to the effect that it is desired to produce.

Having thus described the invention what is claimed is:

1. A compound for curing and coloring meat consisting of pyroligneous acid, pure sugar browned sufficiently to impart color without detracting from its sweetening properties, and water, substantially in the proportions specified.

2. A compound for curing and coloring meat consisting of pyroligneous acid, pure sugar browned sufficiently to impart color without detracting from its sweetening properties, salt, and water, substantially in the proportions specified.

3. A compound for curing and coloring meat consisting of the following ingredients substantially in the proportions specified by weight: pure sugar browned sufficiently to impart color without detracting from its sweetening properties, 25 ounces; pyroligneous acid 27 ounces and pure soft clear water 72.8.

4. A compound for curing and coloring meat consisting of the following ingredients substantially in the proportions specified by weight: pure sugar browned sufficiently to impart color without detracting from its sweetening properties, 25 ounces; pyroligneous acid, 27 ounces; pure soft clear water, 72.8 and salt 3.2.

In testimony that I claim the foregoing as my own, I have hereto affixed my signature in the presence of two witnesses.

EDWARD P. GAINES.

Witnesses:
W. C. JOSEY,
A. V. DENNY.